(12) United States Patent
Cheng et al.

(10) Patent No.: US 11,579,311 B2
(45) Date of Patent: Feb. 14, 2023

(54) METHODS, DEVICES, SYSTEMS, MEDIA, AND RECEIVERS FOR PROCESSING GNSS SIGNALS

(71) Applicant: u-blox AG, Thalwil (CH)

(72) Inventors: Zhenlan Cheng, Thalwil (CH); Aku Levola, Tampere (FI); Clemens Buergi, Thalwil (CH); Paula Syrjarinne, Espoo (FI)

(73) Assignee: u-blox AG, Thalwil (CH)

( * ) Notice: Subject to any disclaimer, the term of this patent is extended or adjusted under 35 U.S.C. 154(b) by 74 days.

(21) Appl. No.: 17/114,405

(22) Filed: Dec. 7, 2020

(65) Prior Publication Data

US 2022/0179098 A1 Jun. 9, 2022

(51) Int. Cl.
*G01S 19/25* (2010.01)
*G01S 19/22* (2010.01)
(Continued)

(52) U.S. Cl.
CPC ............ *G01S 19/256* (2013.01); *G01S 19/22* (2013.01); *G01S 19/243* (2013.01); *G01S 19/254* (2013.01); *G01S 19/31* (2013.01)

(58) Field of Classification Search
CPC ....................................................... G01S 19/32
See application file for complete search history.

(56) References Cited

U.S. PATENT DOCUMENTS

2005/0035905 A1* 2/2005 Gronemeyer ........... G01S 19/30
342/378

2009/0224975 A1* 9/2009 Xhafa ..................... G01S 19/21
342/357.48
(Continued)

FOREIGN PATENT DOCUMENTS

| CA | 2407943 A1 | 8/2002 |
|----|------------|--------|
| EP | 3629060 A1 | 4/2020 |
| JP | 2019 074436 A | 5/2019 |

OTHER PUBLICATIONS

Ioannides, R.T., Aguado, L.E., Brodin, G., "Coherent Integration of Future GNSS Signals," Proceedings of the 19th International Technical Meeting of the Satellite Division of The Institute of Navigation (ION GNSS 2006), Fort Worth, TX, Sep. 2006, pp. 1253-1268. (Year: 2006).*

(Continued)

*Primary Examiner* — Erin F Heard
*Assistant Examiner* — Hailey R Le
(74) *Attorney, Agent, or Firm* — Finnegan, Henderson, Farabow, Garrett & Dunner, L.L.P.

(57) ABSTRACT

Methods, devices, systems, media, and receivers for processing GNSS signals are described. One aspect of the present disclosure provides a method for processing satellite signals of a Global Navigation Satellite System (GNSS), the method comprising: receiving a first GNSS signal transmitted in a first GNSS operational band by a satellite of the GNSS and a second GNSS signal transmitted in a second GNSS operational band by the satellite; tracking the first GNSS signal; generating, from the tracking of the first GNSS signal, tracking parameters for the first GNSS signal; and decoding, at least based on the tracking parameters for the first GNSS signal, the second GNSS signal, wherein the first GNSS operational band is one of L1 band, L2 band or L5 band, and the second GNSS operational band is L6 band.

14 Claims, 9 Drawing Sheets

(51) Int. Cl.
*G01S 19/24* (2010.01)
*G01S 19/31* (2010.01)

(56) References Cited

U.S. PATENT DOCUMENTS

| | | |
|---|---|---|
| 2010/0085250 A1 | 4/2010 | Ahmed et al. |
| 2011/0273332 A1 | 11/2011 | Ahmed et al. |
| 2018/0239026 A1* | 8/2018 | Veitsel ................. G01S 19/243 |
| 2018/0299561 A1* | 10/2018 | Jau ....................... G01S 19/235 |
| 2020/0288426 A1* | 9/2020 | Pascolini .............. G01S 19/421 |
| 2021/0157014 A1* | 5/2021 | Cookman ............... G01S 19/31 |
| 2022/0035044 A1* | 2/2022 | Cookman ............... G01S 19/34 |

OTHER PUBLICATIONS

T. Suzuki et al., "Evaluation of Precise Point Positioning Using MADOCA-LEX via Quasi-Zenith Satellite System," *Proceedings of the 2014 International Technical Meeting of The Institute of Navigation*, San Diego, California, Jan. 27-29, 2014, pp. 460-470 (11 pages).

A. Veitsel et al., "Positioning technology with QZSS signals" *Proceedings of the 2014 International Technical Meeting of The Institute of Navigation, ITM 2014*, San Diego, California, Jan. 27-29, 2014 (9 pages).

Extended European Search Report dated Apr. 20, 2022, for corresponding application No. 21212469.7. (8 pgs.).

Garcia-Pena A. et al., "Analysis of the use of CSK for Future GNSS Signals", GNSS 2013—Proceedings of the 26th International Technical Meeting of the Satellite Division of the Institute of Navigation, Sep. 20, 2013, pp. 1461-1479.

\* cited by examiner

METHODS, DEVICES, SYSTEMS, MEDIA, AND RECEIVERS FOR PROCESSING GNSS SIGNALS

FIELD

The present disclosure relates to Global Navigation Satellite Systems (GNSS), and more particularly, to methods, devices, systems, media and receivers for processing GNSS signals.

BACKGROUND

GNSS are becoming one of critical infrastructures of today's world. A GNSS satellite is capable of transmitting multiple types of GNSS signals, each of which is transmitted over a respective band. A GNSS receiver may be designed to receive two or more types of GNSS signals. Traditionally, the GNSS receiver may process the received two or more types of GNSS signals separately, especially during the acquisition, tracking and decoding stages. This requires a separate processing hardware/software/firmware for each type of received signals. A joint processing of two or more types of GNSS signals is thus desired.

A joint processing of a new type of GNSS signal and a conventional GNSS signal may be challenging. As an example, signals that are transmitted on L6 band are designed to adopt a Code Shift Keying (CSK) modulation scheme. The CSK modulation scheme is different from the modulation scheme used for conventional signals that are transmitted on L1, L2, or L5 band. A conventional design for acquisition, tracking and decoding of the conventional GNSS signal may not be applicable to CSK-modulated signals. There are no commercial CSK decoders based on GNSS receivers known yet.

SUMMARY

Methods, devices, systems, media and receivers for processing GNSS signals are described.

One aspect of the present disclosure provides a method for processing satellite signals of a Global Navigation Satellite System (GNSS), the method comprising: receiving a first GNSS signal transmitted in a first GNSS operational band by a satellite of the GNSS and a second GNSS signal transmitted in a second GNSS operational band by the satellite; tracking the first GNSS signal; generating, from the tracking of the first GNSS signal, tracking parameters for the first GNSS signal; and decoding, at least based on the tracking parameters for the first GNSS signal, the second GNSS signal, wherein the first GNSS operational band is one of L1 band, L2 band or L5 band, and the second GNSS operational band is L6 band.

Another aspect of the present disclosure provides a device for processing navigation satellite signals of a Global Navigation Satellite System (GNSS), the device comprising: a receiver configured to receive a first GNSS signal transmitted in a first GNSS operational band by a satellite of the GNSS and receive a second GNSS signal transmitted in a second GNSS operational band by the satellite; a tracker configured to track the first GNSS signal and generate, from said tracking of the first GNSS signal, tracking parameters for the first GNSS signal; and a decoder configured to decode, at least based on the tracking parameters for the first GNSS signal, the second GNSS signal; wherein the first GNSS operational band is one of L1 band, L2 band or L5 band, and the second GNSS operational band is L6 band.

Another aspect of the present disclosure provides a device for processing satellite signals of a Global Navigation Satellite System (GNSS), the device comprising: one or more processors; and at least one machine-readable medium comprising executable instructions that, when executed by the one or more processors, cause the one or more processors to perform any method described herein.

Another aspect of the present disclosure provides a machine-readable medium comprising executable instructions that, when executed by one or more processors, cause the one or more processors to perform any method described herein.

Another aspect of the present disclosure provides a receiver for a Global Navigation Satellite System (GNSS) comprising the device described herein.

BRIEF DESCRIPTION OF DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The techniques described herein provide methods, devices, systems, media and receivers for processing at least two different types of GNSS signals S1 and S2. In some embodiments, by taking information from tracking of Signal S1, the decoding of Signal S2 requires no independent close loop in each tracking channel for Signal S2. In some embodiments, only one group delay difference (GDD) tracking loop is provided, which takes information from and gives control feedback to decoding channels for Signal S2.

In some embodiments, GDD compensation by the GDD tracking loop is performed adaptively on opportunistic basis depending on detected CSK symbols. This saves the design and manufacturing cost of a dedicated CSK decoder because a GNSS chip can be reused by only firmware change except for SAW filter design in the RF frontend. Besides, the GDD compensation method optimizes the decoding conditions for a lowest bit-error rate.

Figure 1:
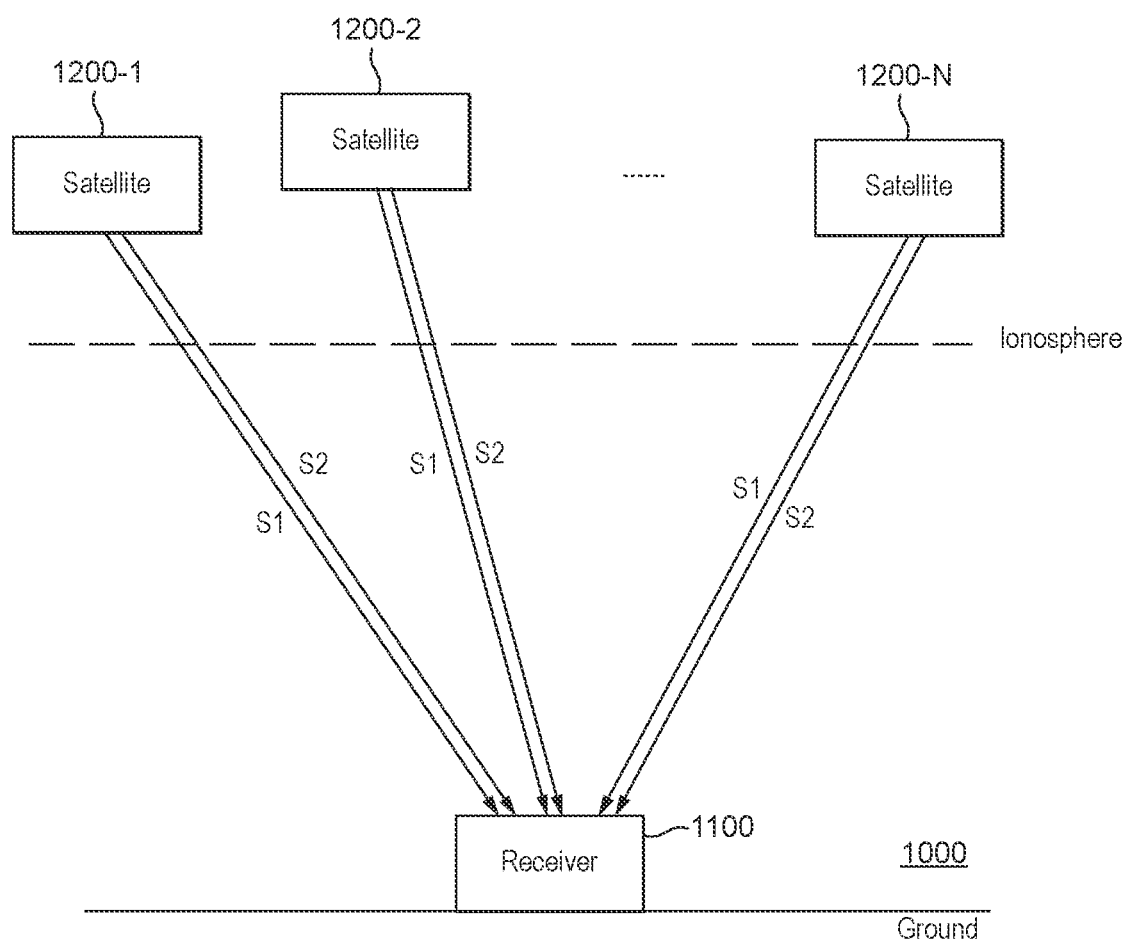
FIG. 1 illustrates an example GNSS in accordance with embodiments herein.

FIG. 1 illustrates an example GNSS 1000 in accordance with embodiments herein. The method and device as described herein may be applied in GNSS 1000.

GNSS 1000 may comprise multiple satellites, such as satellites 1200-1 through 1200-N. Each of satellites 1200-1 through 1200-N may be able to transmit two or more types of GNSS signals simultaneously, such as Signal S1 and Signal S2. Once transmitted by the satellites, Signal S1 and Signal S2 may travel through the free space and be received by receiver 1100. Receiver 1100 could be located, for example, on the ground.

As satellite signals of GNSS 1000, Signal S1 and Signal S2 may be designed as direct sequence spread spectrum (DSSS) signals. PRN (pseudo random noise) codes are usually modulated in the DSSS signals. Signal S1 and Signal S2 may adopt different signal structures. In one aspect, different PRN codes with different code lengths could be adopted for Signal S1 and Signal S2. In another aspect, different modulation schemes may be adopted. For example, Signal S1 may adopt an exclusive-or operation (module-2 addition) in modulating a PRN code, while Signal S2 may adopt a CSK modulation scheme, which will be discussed below. The signal structures of GNSS signals are usually specified in interface control documents (ICDs) or interface specification documents (ISDs) of the GNSS. The ICDs or ISDs are usually publicly provided by the operator of the GNSS.

In an embodiment, Signal S1 and Signal S2 may be transmitted in different bands and provide different services. For example, Signal S1 may be transmitted on a first GNSS operational band, while Signal S2 may be transmitted on a second GNSS operational band that is different from the first GNSS operational band. The operational bands over which GNSS signals can be transmitted are also specified in ICDs or ISDs of the GNSS.

Generally, Signal S1 and Signal S2 that are transmitted by the same satellite are strictly synchronized with each other before transmission, because the generation of Signal S1 and the generation of Signal S2 may use a common atomic clock on the satellite. For example, Signal S1 and Signal S2 transmitted by satellite 1200-1 may be synchronized with each other, and Signal S1 and Signal S2 transmitted by satellite 1200-N may be synchronized with each other. The synchronization between Signal S1 and Signal S2 of the same satellite may allow receiver 1100 to jointly process the two signals or use one signal to aid processing of another signal.

In an embodiment, receiver 1100 may process received Signal S1 and Signal S2 so as to determine position, navigation and/or timing (PNT) information associated with receiver 1100. For example, receiver 1100 may acquire, track and decode a plurality of Signals S1 that are transmitted by a plurality of satellites 1200-1 through 1200-N. The measurements gathered during tracking and the messages decoded from Signals S1 could be used to calculate the PNT information. In an embodiment, the measurements gathered during tracking of Signal S1 may be used for decoding of Signal S2. This will be discussed in more details below.

According to the present disclosure, Signal S1 and Signal S2 can be any two types of GNSS signals that may be simultaneously transmitted by the same satellite of a GNSS. Table 1 shows multiple types of GNSS signals that are transmitted by Quasi-Zenith Satellite System (QZSS) developed by Japan. As an example, Signal S1 and Signal S2 can be selected from the listed signals.

TABLE 1

| GNSS operational band | Nominal carrier frequency | Signal Name | PRN Code Modulation Scheme | Service Name |
| --- | --- | --- | --- | --- |
| L1 | 1575.42 MHz | L1C/A | module-2 addition | C/A |
|  |  | L1C | module-2 addition | L1CP |
|  |  |  | module-2 addition | L1CD |
| L2 | 1227.60 MHz | L2C | module-2 addition | L2CL |
|  |  |  |  | L2CM |
| L5 | 1176.45 MHz | L5 | module-2 addition | I5 |
|  |  |  |  | Q5 |
| L6 | 1278.75 MHz | L61 L62 | CSK | CLAS |

In an embodiment, Signal S1 may be any of signals transmitted on L1, L2, or L5 bands (also referred as "L1 signal", "L2 signal" or "L5 signal" hereinafter). Note that L1 signal includes any of L1C/A signal or L1C signal, while L1C signal may be a signal used for any of L1CP or L1CD service. L2 signal includes L2C signal that may be a signal used for any of L2CL or L2CM service. L5 signal may be a signal used for any of I5 or Q5 service. The signal structures of any of L1, L2 or L5 signal is specified in ISDs of QZSS and thus is well-known to the public.

In an embodiment, Signal S2 may be a signal transmitted on L6 band (also referred as "L6 signal" hereinafter). Note that L6 signal may include any of L61 signal or L62 signal, L6 signal could be used for Centimeter-Level Augmentation Service (CLAS). Hence, L6 signal could also be referred as a CLAS signal. The signal structures of L6 signal is also specified in ISDs of QZSS and thus is well-known to the public.

L6 signal is new in relative to L1, L2 or L5 signal. For example, when modulating a PRN code with a navigation message, L6 signal adopts a CSK modulation scheme other than a conventional module-2 addition operation. In generating conventional GNSS signals such as L1, L2 or L5 signals, a module-2 addition operation is performed on a navigation message and a PRN code so as to modulate the navigation message and the PRN code together. The CSK modulation, however, shifts the phase of the PRN code by a number of code chips that is indicated by the navigation message.

Figure 2A:
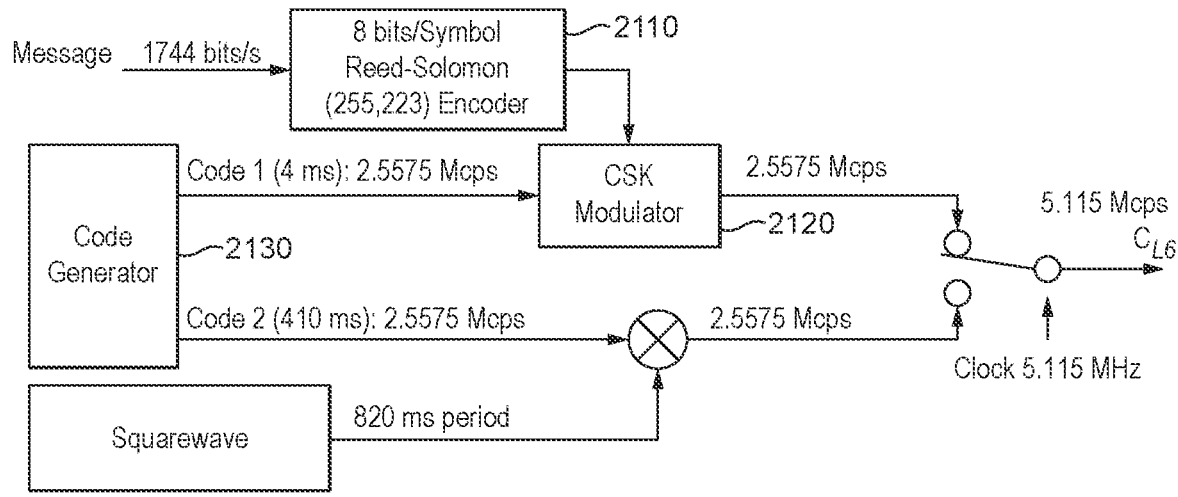
FIGS. 2A-2B illustrate generation of example L6 signals of Quasi-Zenith Satellite System (QZSS)
Figure 2B:
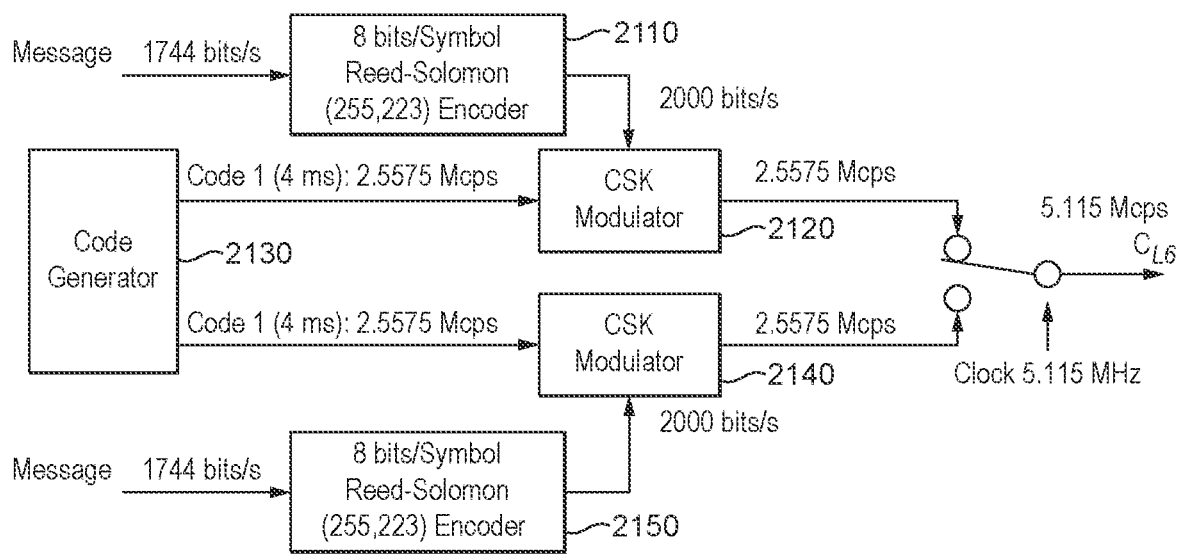

FIGS. 2A-2B illustrate generation of example L6 signals of QZSS. The generation may be performed in the satellite (e.g., satellite 1200-1 through satellite 1200-N).

FIG. 2A illustrates generation of L61 signal of QZSS. L61 signal contains two streams. A first stream of the two streams, indicated by the upper branch in FIG. 2A, contains a navigation message. The first steam includes a 4-ms PRN short code modulated by means of CSK by Reed Solomon (R-S) encoded navigation message. Specifically, a navigation message is provided to an 8 bits/symbol R-S encoder 2110. The R-S encoder 2110 generates corresponding 8-bit encoded navigational message symbols (CSK symbols). A CSK modulator 2120 receives the 8-bit encoded navigational message symbols generated by the R-S encoder 2110 and a 4-ms PRN code (Code 1) generated by a code generator 2130. The CSK modulator 2120 shifts the phase of the PRN code by a number of code chips as indicated by the 8-bit encoded navigational message symbol. A second stream of L61 signal is indicated by the lower branch in FIG. 2A, which includes a 410-ms PRN long code (Code 2) modulated by a square-wave with a period of 820 ms beginning from 0 ("010101 . . . ").

FIG. 2B illustrates generation of L62 signal of QZSS. L62 signal contains two streams, L6D and L6E. Steams L6D and L6E each contain a respective navigation message. Steams L6D and L6E are both CSK-modulated. As shown in FIG. 2B, the modulation of each of steams L6D and L6E is similar to the modulation of the first stream of L61 signal. Hence, the description of the modulation of each of L6D and L6E is omitted. In FIG. 2B, an additional CSK modulator 2140 and an additional 8 bits/symbol R-S encoder 2150 are used.

Figure 3:
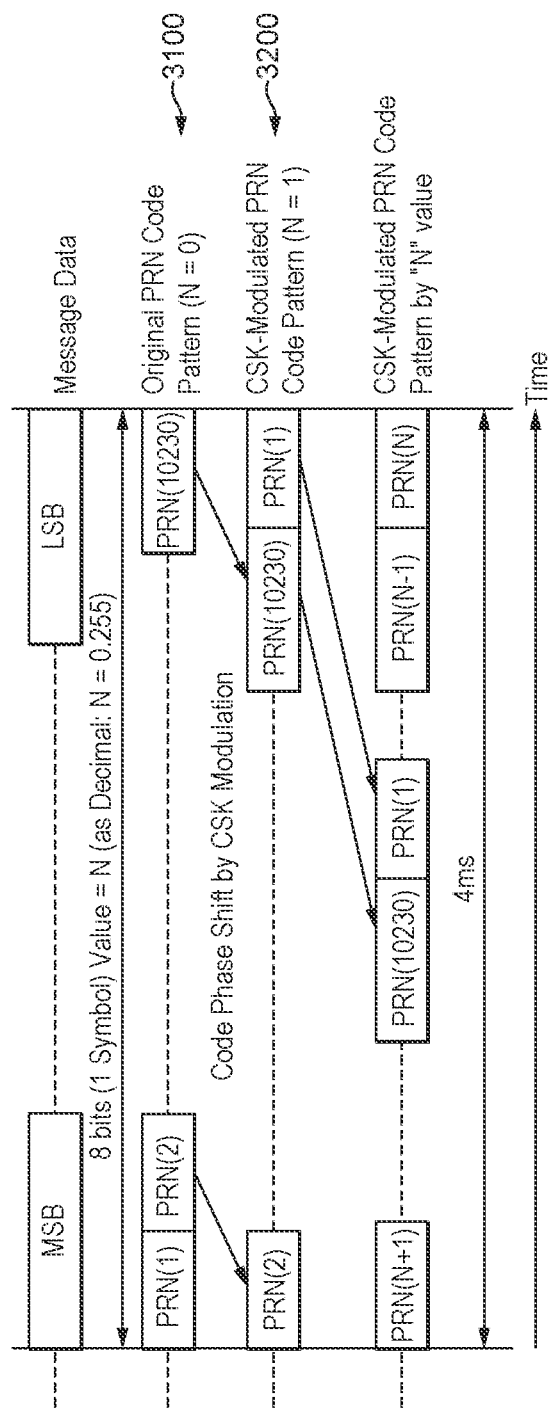
FIG. 3 illustrates an example CSK modulation scheme used for L6 signals of QZSS.

FIG. 3 illustrates an example CSK modulation scheme used for L6 signals of QZSS. The illustrated CSK modulation may be performed by the CSK modulators of FIGS. 2A-2B. As one input of the CSK modulation, the original PRN code may be a sequence of PRN code chips generated by a code generator, as indicated by original PRN code pattern 3100. An 8-bit encoded navigational message symbol may be provided as another input of the CSK modulation. The CSK modulation shifts the original PRN code by N code chips, where N is a value indicated by the 8-bit encoded navigational message symbol. For example, with N=0, the original PRN code will not be shifted by the CSK modulation. With N=1, the original PRN code will be left-shifted by 1 code chip, as indicated by CS K-modulated PRN code pattern 3200. That is, code chip PRN (2) will become the first code chip of the shifted PRN code while code chip PRN (1) will become the last code chip. The shifted PRN code is output by the CSK modulation. A total number (denoted as P hereinafter) of possible shifted phases depends on the length of encoded navigational message symbol. For example, since the 8-bit encoded navigational message symbol has $2^8=256$ possible values, the shifted PRN code output by the CSK modulation would have 256 different shifted phases (P=256).

It is appreciated that GNSS and Signal S1 and Signal S2 described herein are discussed by way of example and is not intended to be limiting. In an aspect, GNSS 1000 can be any system that adopts the concept of satellite navigation. For example, GNSS 1000 can be any one of global systems including GPS system, BeiDou system, Galileo system, GLONASS system, and/or a regional navigation satellite system, such as Quasi-Zenith Satellite System (QZSS) developed by Japan. In an embodiment, GNSS 1000 may be QZSS. In another embodiment, GNSS 1000 may be any other system that is different from QZSS but also transmits L1, L2 or L5 signals. In another aspect, Signal S1 and Signal S2 may not be limited to L1, L2, L5 and L6 signals that are currently broadcasting, but instead, include any further evolutions thereof. In an embodiment, the CSK modulation scheme of QZSS may use different parameters. For example, the encoded navigational message symbol may have a different length from 8 bits, resulting in a different value of P. Note that Signal S1 and Signal S2 may be real satellite signals transmitted from a satellite in orbit.

Figure 4:
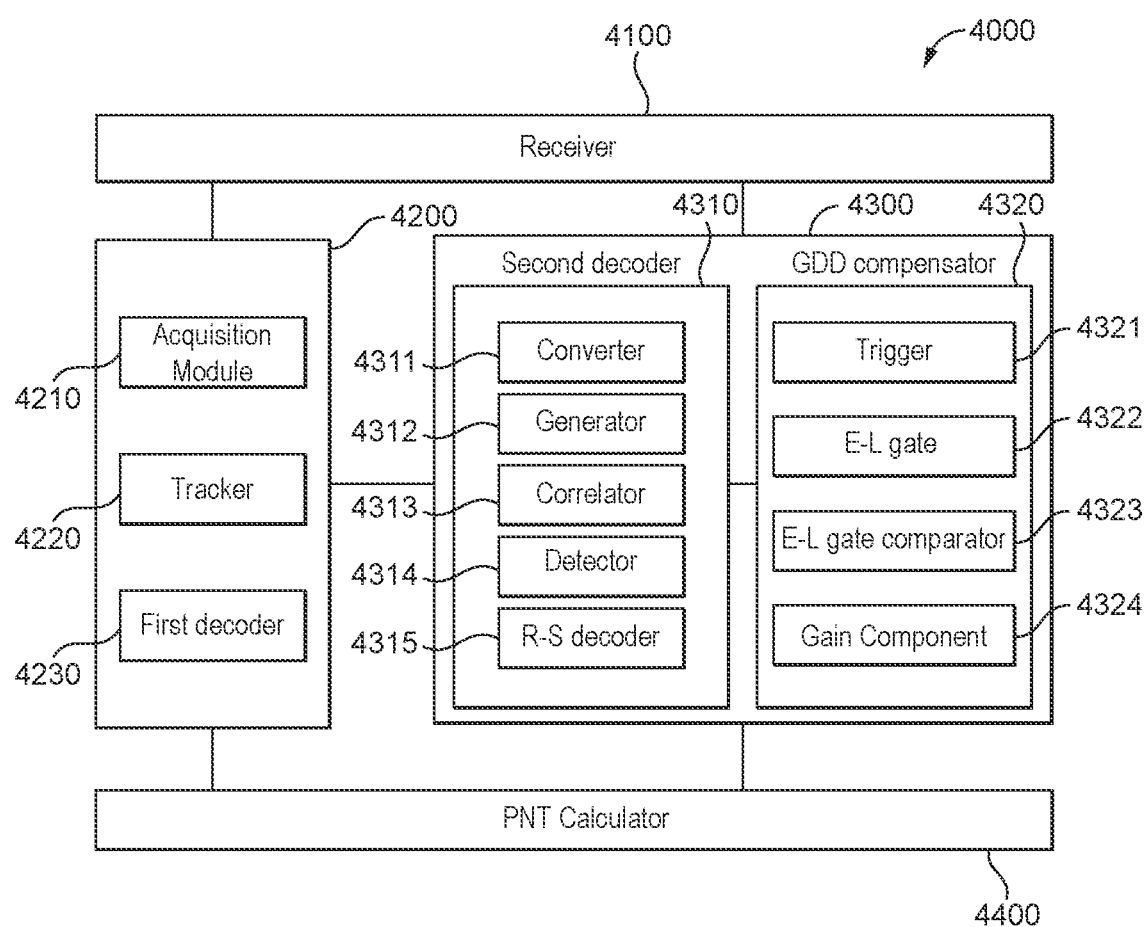
FIG. 4 is a block diagram illustrating an example device for processing two different types of GNSS signals in accordance with embodiments herein.

FIG. 4 is a block diagram illustrating an example device for processing two different types of GNSS signals in accordance with embodiments herein. Device 4000 may be implemented in or be implemented as receiver 1100 of FIG. 1. In an embodiment, device 4000 may include a receiver 4100, a first processing module 4200, a second processing module 4300 and a PNT calculator 4400.

In an embodiment, receiver 4100 may be configured to receive a first GNSS signal (Signal S1) transmitted in a first GNSS operational band by a satellite of the GNSS and receive a second GNSS signal (Signal S2) transmitted in a second GNSS operational band by the same satellite.

In an embodiment, the first GNSS operational band over which Signal S1 is transmitted may be one of L1 band, L2 band or L5 band, and the second GNSS operational band over which Signal S2 is transmitted may be L6 band.

In an embodiment, first processing module 4200 may be configured to process Signal S1. First processing module 4200 may include an acquisition module 4210, a tracker 4220 and a first decoder 4230. Acquisition module 4210 may be configured to perform an acquisition process to determine which Signal S1 is currently visible in the received signal. Acquisition module 4210 may provide information about a visible Signal S1 to tracker 4220. Tracker 4220 may be configured to perform a tracking process to track a Signal S1 that has been determined to be visible. From the tracking of Signal S1, tracker 4220 may generate tracking parameters for Signal S1. For example, the generated tracking parameters may include at least one of Doppler frequency and a code phase for Signal S1. With Signal S1 being tracked, first decoder 4230 may be configured to perform a decoding process to decode navigation messages from Signal S1. The decoded message, as well as measurements gathered during the tracking of Signal S1, may be provided to PNT calculator 4400.

Note that the acquisition process by acquisition module 4210, the tracking process by tracker 4220, and the decoding process by first decoder 4230 are performed with respect to only Signal S1 and are not performed with respect to Signal S2. In the case where Signal S1 is one of L1, L2 or L5 signals, there are many known acquisition processes, tracking processes and decoding processes for a particular type of Signal S1. These known processes, as well as any other future-developed processes, can be performed by acquisition module 4210, tracker 4220 and first decoder 4230 without limitations. Accordingly, acquisition module 4210, tracker 4220 and first decoder 4230 may contain necessary hardware/software/firmware for the particular type of Signal S1.

In one embodiment, first processing module 4200 may be configured to provide the generated tracking parameters for Signal S1 to second processing module 4300. The tracking parameters for Signal S1 may be used by second processing module 4300 for decoding of Signal S2.

In an embodiment, second processing module 4300 may be configured to process Signal S2, including decoding Signal S2 at least based on the tracking parameters for Signal S1. The operations of second processing module 4300 are discussed in more details below.

In an embodiment, second processing module 4300 may include a second decoder 4310. Second decoder 4310 may be configured to perform a decoding process that decodes Signal S2 based on the tracking parameters for Signal S1. The decoding process for Signal S2 can be performed without an acquisition process and/or a tracking process for Signal S2. Advantageously, the cost related to the acquisition process and/or the tracking process for Signal S2 may be saved. For example, device 4000 may omit hardware/software/firmware for acquiring and/or tracking Signal S2.

In order to decode a navigation message from Signal S2 based on the tracking parameters for Signal S1, second decoder 4310 may include a converter 4311, one or more local signal generators 4312, one or more correlators 4313, a symbol detector 4314 and an R-S decoder 4315.

In an embodiment, converter 4311 may be configured to derive, from the tracking parameters for the Signal S1, parameters for decoding Signal S2. The derived parameters may comprise Doppler frequency for Signal S2 and one or more code phase hypotheses for Signal S2.

In an embodiment, local signal generators 4312 may be configured to generate one or more local replicas of Signal S2 based on derived Doppler frequency for Signal S2 and the one or more code phase hypotheses for Signal S2.

In an embodiment, correlators 4313 may be configured to correlate Signal S2 with the one or more local replicas as generated by the local signal generators 4312.

In an embodiment, symbol detector 4314 may be configured to detect one or more CSK symbols based on the correlating by correlators 4313.

In an embodiment, R-S decoder 4315 may be configured to detect and/or correct bit errors in the one or more CSK symbols detected by symbol detector 4314. The output of R-S decoder 4315 may be provided as a part of decoded navigation messages of Signal S2. The decoded navigation messages of Signal S2 may be provided to PNT calculator 4400.

In an embodiment, PNT calculator 4400 may be configured to calculate position, navigation and timing information associated with device 4000 based on decoded navigation messages and measurements of Signal S1 and/or Signal S2.

As described above, device 4000 is capable of providing a joint processing of L6 signal with a conventional signal of L1, L2 or L5 signal. Note that the decoding of L6 signal is based on tracking parameters for the conventional signal. Advantageously, L6 signal can be processed with a relatively low cost. Also, a joint processing of two types of signals may provide better performance than processing a single type of signal, thereby providing greater accuracy, for example, centimeter-level accuracy.

Note that Signal S1 and Signal S2 are transmitted in different GNSS operational bands. There will be a group delay difference (GDD) between received Signal S1 and Signal S2. The GDD between Signal S1 and Signal S2 may be varying over time. It is beneficial to adaptively and dynamically compensate the GDD during the decoding of Signal S2.

In an embodiment, second processing module 4300 may include a GDD compensator 4320. GDD compensator 4320 may be configured to calculate a GDD between Signal S1 and Signal S2 based on the decoding of Signal S2. The calculated GDD may represent a difference between a group delay of received Signal S1 and a group delay of received Signal S2. GDD compensator 4320 may be configured to feedback the calculated GDD for decoding of Signal S2. As such, the GDD may be adaptively and dynamically compensated in real time.

In an embodiment, GDD compensator 4320 may comprise a trigger module 4321 and at least one pair of early-late (E-L) gates 4322. The trigger module 4321 may be configured to trigger the calculation of GDD in response to a predefined condition. The predefined condition may include detection of one or more specific CSK symbols. The early-late gates 4322 may be configured to, once triggered, track a specific code phase corresponding to the detected CSK symbol.

To calculate the GDD, in an embodiment, GDD compensator 4320 may further comprise an early-late gate comparator 4323. The early-late gate comparator 4323 may be configured to determine a code phase delay correction based on the correlation result of the triggered pair of early-late gates.

In an embodiment, GDD compensator 4320 may further comprise a gain component 4324. Gain component 4324 may be configured to apply a gain to the code phase delay correction output by the early-late gate comparator 4323. The output of the gain component may be determined as the calculated GDD.

In an embodiment, GDD compensator 4320 may be configured to update code phase hypotheses for Signal S2 based on at least the calculated GDD. As a result, the GDD contained in the original code phase hypotheses may be compensated. The updated code phase hypotheses will be more accurate as compared to the original code phase hypotheses.

In an embodiment, GDD compensator 4320 may be configured to feedback the updated code phase hypotheses to the second decoder 4310. Second decoder 4310 may use the updated code phase hypotheses for the decoding of Signal S2.

In an embodiment, GDD compensator 4320 may be configured to further feedback updated code phase hypotheses to the early-late gates 4322, such that the local replicas of Signal S2 used by the early-late gates 4322 may also be updated.

With GDD compensator 4320, GDD between Signal S1 and Signal S2 will be compensated in the updated code phase hypotheses. Updated code phase hypotheses for Signal S2 are more accurate as compared to those hypotheses uncompensated. This will provide a better performance for the decoding of Signal S2.

Also, note that GDD compensator 4320 may provide updated code phase hypotheses for Signal S2 each time a predefined condition (for example, detection of one or more specific CSK symbols) occurs. As a result, the updated code phase hypotheses will be dynamically generated during the decoding of Signal S2. GDD compensator 4320 allows adaptively and dynamically compensating for GDD between Signal S2 (decoding) and Signal S1 (tracking).

Figure 5:
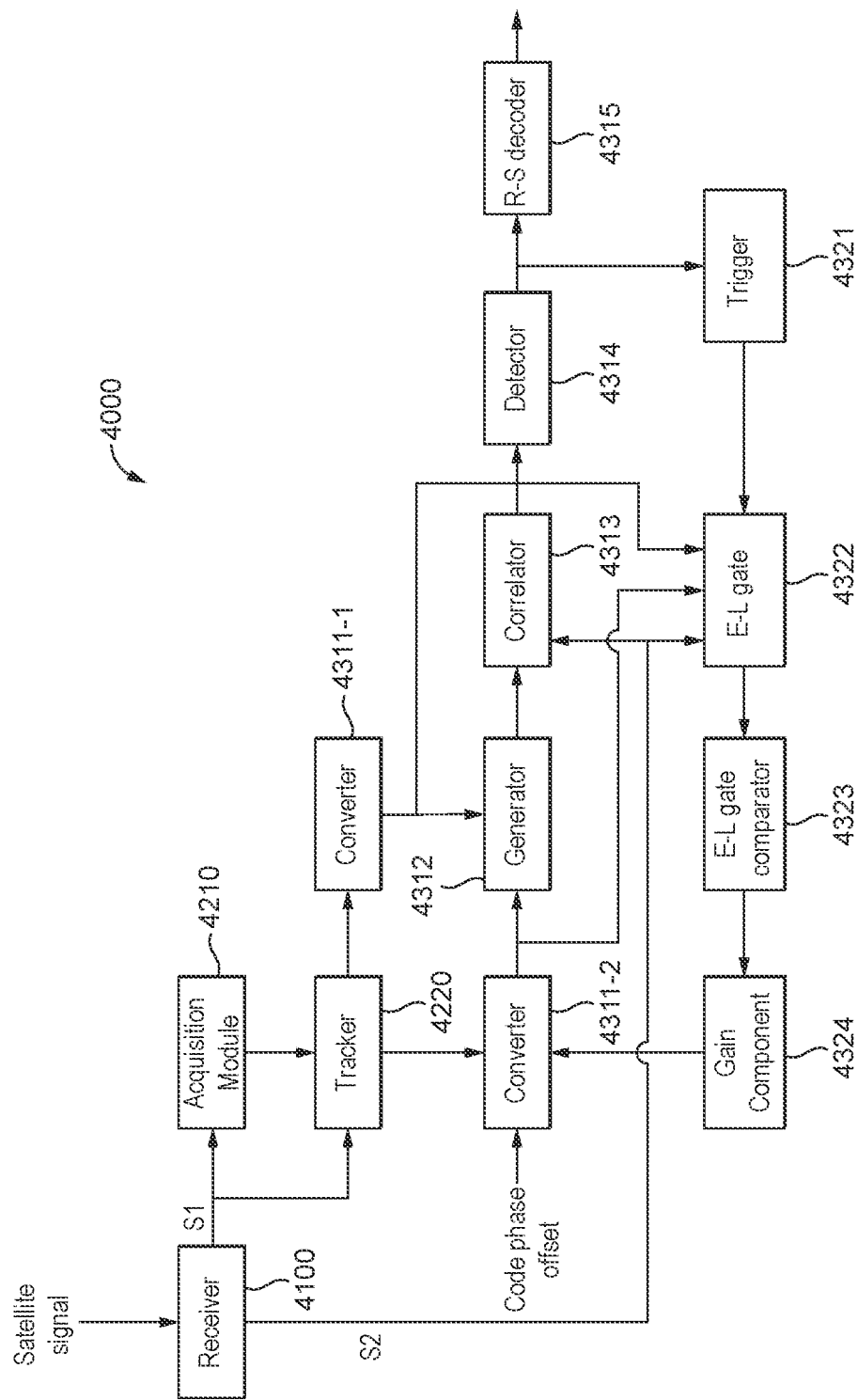
FIG. 5 is a block diagram of a specific example of device of FIG. 4 in accordance with embodiments herein.

FIG. 5 is a block diagram of a specific example of device 4000 of FIG. 4 in accordance with embodiments herein. For clarity and simplicity, some of the elements of device 4000 are omitted from FIG. 5, such as first decoder 4230, PNT calculator 4400, etc.

In an embodiment, receiver 4100 may be configured to receive a satellite signal from a navigation satellite of a GNSS (for example, GNSS 1000). The received satellite signal may comprise at least two different types of GNSS signals (for example, Signal S1 and Signal S2) that are transmitted in different GNSS operational bands. For example, receiver 4100 may be configured to receive Signal S1 transmitted in a first GNSS operational band and receive Signal S2 transmitted in a second GNSS operational band. Signal S1 and Signal S2 may be transmitted from the same satellite (e.g., any of satellite 1200-1 through 1200-N of FIG. 1).

In an embodiment, receiver 4100 may include necessary elements to receive Signal S1 and Signal S2. In one example, receiver 4100 may include antenna elements that are used for receiving signals in the first and the second GNSS operational bands. Additionally, receiver 4100 may further include elements to perform additional processing, such as low noise amplifiers, filters, down-converters and analog-to-digital converters. In another example where device 4000 is implemented as a chip/micro-processor, receiver 4100 may not include hardware like antenna elements but may include one or more interfaces that are used for receiving digital signal data streams (for example, intermediate frequency signal data streams) from other front-end elements. Receiver 4100 may include different and separate elements for receiving and processing Signal S1 and Signal S2 respectively.

In an embodiment, receiver 4100 may generate two sample streams representative of received Signal S1 and Signal S2. For example, a first sample stream may comprise a sequence of signal samples that are representative of received Signal S1 and sampled from the first GNSS operational band. A second sample stream may comprise a sequence of signal samples that are representative of received Signal S2 and sampled from the second GNSS operational band.

In an embodiment, acquisition module 4210 may be connected to receiver 4100 and receive the first sample stream representative of received Signal S1. Acquisition module 4210 may be configured to perform an acquisition process to determine which signals are currently visible in the first sample stream. Usually, not all satellites of a GNSS could be seen by a receiver at a point in time. Hence, acquisition module 4210 may receive the first sample stream and identify which signals are currently visible in the first sample stream. For example, acquisition module 4100 may determine that a Signal S1 transmitted by satellite 1200-1 and a Signal S1 transmitted by satellite 1200-2 are both visible in the first sample stream while another Signal S1 transmitted by satellite 1200-N is not visible in the first sample stream. Acquisition module 4210 may provide information about a visible Signal S1 to tracker 4220, so that tracker 4220 can track said Signal S1. The information about the visible Signal S1 may include, for example, an identifier and a rough code phase of said Signal S1. The rough code phase generated by the acquisition module 4210 may indicate a rough estimate of the code phase of said Signal S1, which may provide an initial value of code phase for tracking by the tracker 4220.

In an embodiment, tracker 4220 may be connected to receiver 4100 and acquisition module 4210. Tracker 4220 may receive the first sample stream representative of received Signal S1 from receiver 4100 and receive information about visible Signal S1 from acquisition module 4210.

Tracker 4220 may be configured to perform a tracking process to track the Signal S1 that has been determined to be visible. The tracking process may include generating a local replica of Signal S1 being tracked, correlating the local replica with the Signal S1, determining the deviations between the local replica and the Signal S1 being tracked based on the correlation result, and adjusting the local replica based on the determined deviations. Accordingly, tracker 4220 may include or may be connected to signal replica generators and correlators for Signal S1, which are omitted herein.

From tracking of Signal S1, tracker 4220 may also generate tracking parameters for Signal S1. For example, the generated tracking parameters includes at least one of Doppler frequency for Signal S1 and a code phase for Signal S1.

The Doppler frequency for Signal S1 may refer to a frequency offset between the nominal carrier frequency of Signal S1 and the actual center frequency of received Signal S1. The Doppler frequency is caused by a relative movement between the satellite that is transmitting Signal S1 and the receiver that is receiving said Signal S1. Doppler frequency is a function of the velocity of the relative movement and the nominal carrier frequency of Signal S1. The generated Doppler frequency may be used to adjust the code chip rate of a PRN code in the local replica, such that the local replica may resemble the received Signal S1 as much as possible.

The code phase for Signal S1 may refer to the phase of the PRN code of the received Signal S1 relative to the local replica. For example, the received Signal S1 may go beyond the local replica or fall behind the local replica, both of which will result in misalignment between the PRN code of the received Signal S1 and the PRN code of the local replica. By determining the code phase for Signal S1 and eliminating a corresponding misalignment, the local replica can be aligned with the received Signal S1 such that a better correlation performance may be achieved.

In an embodiment, tracker 4220 may provide the tracking parameters for Signal S1 to converter 4311 (including converters 4311-1 and 4311-2). Converter 4311 may be configured to derive, from the tracking parameters for the Signal S1, parameters for decoding Signal S2.

In the embodiment shown in FIG. 5, converter 4311 is divided into two converters 4311-1 and 4311-2. Converter 4311-1 may be configured to calculate Doppler frequency for Signal S2, while converter 4311-2 may be configured to generate one or more code phase hypotheses for Signal S2.

In an embodiment, converter 4311-1 may receive the tracking parameters for the Signal S1 from tracker 4220, including at least Doppler frequency for Signal S1. Doppler frequency for Signal S2 may be derived by converter 4311-1 based on Doppler frequency for Signal S1. Since Signal S1 and Signal S2 are transmitted by the same satellite and received by the same receiver, the relative velocity between the satellite and the receiver are the same for both Signal S1 and Signal S2. Accordingly, there may be a fixed ratio between Doppler frequency for Signal S1 and Doppler frequency for Signal S2. Doppler frequency for Signal S2 can be derived based on the Doppler frequency for Signal S1 and the nominal carrier frequencies of Signal S1 and Signal S2.

In an embodiment, converter 4311-1 may calculate Doppler frequency for Signal S2 as follows:

$$f_2 = f_1 * (F_2/F_1), \qquad \text{(Equation 1)}$$

where $F_1$ represents a nominal carrier frequency of Signal S1, $f_1$ represents the Doppler frequency for Signal S1, $F_2$ represents a nominal carrier frequency of Signal S2, and $f_2$ represents the Doppler frequency for Signal S2.

Note that Doppler frequency for Signal S1 ($f_1$) may be generated and provided by tracker 4220. $F_1$ and $F_2$ are values that are constant and known. For example, if Signal S2 is L6 signal, then $F_2$ is a corresponding nominal carrier frequency of 1278.75 MHz. If Signal S1 is L1, L2, or L5 signal, then $F_1$ is a corresponding nominal carrier frequency of 1575.42 MHz, 1227.60 MHz, or 1176.45 MHz.

In an embodiment, converter 4311-2 may receive the tracking parameters for the Signal S1 from tracker 4220, including at least the code phase for Signal S1. One or more code phase hypotheses for Signal S2 may be derived by converter 4311-2 based on the code phase for Signal S1. The one or more code phase hypotheses each correspond to a hypothesis regarding where a particular PRN code chip (for example, PRN (1)) occurs in the received Signal S2. Each of the one or more code phase hypotheses for Signal S2 may include two portions of (1) a code phase of the entirety of the PRN code in the received Signal S2 and (2) a possible number of code chips that have been shifted within the PRN code during a CSK modulation. The number of the one or more code phase hypotheses for Signal S2 may be equal to the number of possible shifted code phases in the CSK modulation (i.e., P).

Note that Signal S1 and Signal S2 were transmitted by the same satellite and synchronized with each other. Hence, it is feasible to generate the one or more code phase hypotheses for Signal S2 based on the code phase for Signal S1 that has been generated during the tracking of Signal S1. For example, the initial code phase hypothesis may be generated by copying the code phase for Signal S1 and adding an offset. The remaining code phase hypotheses may be generated by adding a respective number of code phase increments to the initial code phase hypothesis.

In an embodiment, converter 4311-2 may generate the one or more code phase hypotheses for Signal S2 as follow:

$$T_2(0)=T_1+D, \quad \text{(Equation 2)}$$

$$T_2(k)=T_2(0)+k*\Delta T, k=0,\ldots,P-1 \quad \text{(Equation 3)}$$

where: $T_1$ represents the code phase for Signal S1, which is one of the tracking parameters for Signal S1 and may be generated and provided by tracker 4220 of first processing module 4200; D represents a code phase offset between Signal S1 and Signal S2, which may be a predetermined value based on nominal characteristics of Signal S1 and Signal S2; k is an index for code phase hypothesis, and $T_2(k)$ represents the $k_{th}$ code phase hypothesis for Signal S2; $\Delta T$ represents a code phase increment between two neighboring code phase hypotheses for Signal S2, which may be a predetermined value (for example, a predetermined number of code chips) in accordance with the CSK modulation; and P represents a total number of possible code phases used in the CSK modulation for Signal S2. P is 256 in the example CSK modulation as shown in FIG. 3. P also indicates a total number of the generated one or more code phase hypotheses for Signal S2.

Converter 4311 may provide the derived one or more parameters to local signal generators 4312. Specifically, converter 4311-1 may provide the calculated Doppler frequency for Signal S2 to local signal generators 4312, and the converter 4311-2 may provide the generated one or more code phase hypotheses for Signal S2 to local signal generators 4312.

In an embodiment, local signal generators 4312 may be configured to generate one or more local replicas of Signal S2 based on the Doppler frequency for Signal S2 and the one or more code phase hypotheses for Signal S2. The number of the one or more local replicas of Signal S2 depends on the number of one or more code phase hypotheses for Signal S2. For example, local signal generators 4312 may generate a total of P local replicas, each of which is generated under a respective code phase hypothesis of the one or more code phase hypotheses for Signal S2. Further, Doppler frequency for Signal S2 may be used to determine the chip rate of the one or more local replicas. Local signal generators 4312 may be configured to provide the generated one or more local replicas of Signal S2 to correlators 4313.

In an embodiment, correlators 4313 may receive the second sample stream representative of received Signal S2 from receiver 4100 and receive the one or more local replicas of Signal S2 from local signal generators 4312. Correlators 4313 may be configured to correlate the second sample stream with each of the one or more local replica of Signal S2. Each correlation result may be generated over a correlation period (for example, 1 ms). For each of the one or more local replica of Signal S2, there is a corresponding sequence of correlation results. Each sequence may further correspond to a respective code phase hypothesis of the one or more code phase hypotheses for Signal S2. Correlators 4313 may provide the sequences of correlation results to symbol detector 4314.

Symbol detector 4314 may be configured to perform a detection process to detect one or more CSK symbols. Symbol detector may further integrate each sequence of correlation results generated by correlators 4313 to a CSK symbol length (for example, 4 ms). The detection process may be a maximum likely (ML) detection, which picks the CSK symbol that shows the maximum energy after the integration. For example, the integration magnitudes may be compared pair-wise so as to quickly find the maximum integration magnitude. The detection process may pick a CSK symbol that corresponds to the maximum integration magnitude as the detected CSK symbol. Each CSK symbol corresponds to a respective one of the one or more code phase hypotheses for Signal S2, so the code phase hypotheses that corresponds to the detected CSK symbol may also be determined. Symbol detector 4314 may provide the detected CSK symbol to R-S decoder 4315.

R-S decoder 4315 may be configured to detect and/or correct bit errors in the detected CSK symbols. The decoding algorithm adopted by R-S decoder 4315 may correspond to the coding algorithm adopted by the satellite, for example, by the 8 bits/symbol R-S coding module as shown in FIGS. 2A-2B. A CSK symbol may be mapped to 8 channel bits, and the stream of the channel bits drives a standard R-S decoder. R-S decoder 4315 may output decoded info bits as a part of a navigation message. The decoded info bits may be provided to PNT calculator 4400 (omitted in FIG. 5) for calculating position, navigation and timing information associated with device 4000.

Note that Equation 2 above describes a constant code phase offset D between Signal S1 and Signal S2. However, the actual code phase offset between Signal S1 and Signal S2 may not be constant for a variety of reasons. For example, Signal S1 and Signal S2 may each suffer from a respective group delay when travelling from the satellite to the receiver. There might be a difference between the group delay of Signal S1 and the group delay of Signal S2. In addition, each group delay may be varying due to a changing environment, such as a change to the ionosphere through which Signal S1 and Signal S2 travel. A constant assumption D of the code phase offset between Signal S1 and Signal S2 may not reflect the varying GDD between Signal S1 and Signal S2. It is beneficial to calculate the GDD in real time and perform the decoding of Signal S2 based on calculated GDD adaptively.

In an embodiment, a trigger module 4321 is provided that receives the detected CSK symbol from symbol detector 4314. The trigger module 4321 may be configured to determine whether a CSK symbol detected by symbol detector 4313 corresponds to a particular code phase included in a pre-defined group of code phase hypotheses for the Signal S2. In response to a determination that the CSK symbol corresponds to the particular code phase included in the pre-defined group of code phase hypotheses, trigger module 4321 may be configured to send a trigger signal to the early-late gates 4322 to indicate that the specific CSK symbol and/or the particular code phase have been detected.

In an embodiment, the early-late gates 4322 may comprise one or more pairs of early-late gates. The number of pairs of early-late gates may depend on the size of the pre-defined group of code phase hypotheses. Each pair of early-late gates may be used for tracking a respective code phase included in the pre-defined group of code phase hypotheses. Once receiving the trigger signal from trigger module 4321, the early-late gates 4322 may trigger a pair of early-late gates that corresponds to the detected CSK symbol/particular code phase, so as to track said particular code phase.

Specifically, the triggered pair of early-late gates may comprise an early correlating channel and a late correlating channel. The early correlating channel may correlate received Signal S2 with an early local replica of Signal S2, the early local replica being advanced from the particular code phase by a certain amount of code chip (for example, ½ code chip). The late correlating channel may correlate received Signal S2 with a late local replica of Signal S2, the late local replica being delayed from the particular code phase by the same amount of code chip (for example, ½ code chip). The early local replica and the late local replica may be generated based on the particular code phase and Doppler frequency for Signal S2 that is received from converter 4311. The received Signal S2 may be received from receiver 4100. The early correlating channel and the late correlating channel may generate an early correlation result and a late correlation result, respectively. Note that these channels are not used for CSK symbol detection but only for slow code tracking.

In an embodiment, early-late gate comparator 4323 may receive the correlation results (i.e., the early correlation result and the late correlation result) of the triggered pair of early-late gates in the early-late gates 4322. The early-late gate comparator 4323 may be configured to determine a code phase delay correction based on the early correlation result and the late correlation result. For example, the early-late gate comparator 4323 may be configured to generate a prompt code phase of the received Signal S2 by comparing the early correlation result and the late correlation result. The prompt code phase may represent the actual code phase of received Signal S2. The code phase delay correction may be determined as a difference between the particular code phase tracked by the triggered pair of early-late gates and the determined prompt code phase of the received Signal S2.

In an embodiment, gain component 4324 may be provided. Gain component 4324 may be connected to the output of the early-late gates 4323. Gain component 4324 may be configured to receive the determined code phase delay correction and apply a gain thereto. The applied gain may be any desired value and may be predetermined. Due to the slow changing nature of the ionosphere process, the GDD may be associated with a very small gain. In an example, the applied gain may be a small factor that is less than 1. In this case, the gain component 4324 may be also referred to as an attenuator. The output of the gain component may be determined as the calculated GDD between Signal S1 and Signal S2.

In an embodiment, the calculated GDD may be fed to converter 4311-2 so as to update one or more code phase hypotheses for Signal S2. For example, converter 4311-2 may add the calculated GDD to the one or more code phase hypotheses that were determined according to Equation 2 and Equation 3.

In an embodiment, converter 4311-2 may determine the updated one or more code phase hypotheses for Signal S2 as follow:

$$T'_2(0) = T_1 + D + GDD, \quad \text{(Equation 4)}$$

$$T'_2(k) = T'_2(0) + k*\Delta T, k=0, \ldots, P-1 \quad \text{(Equation 5)}$$

where: $T_1$ represents the code phase for Signal S1, which is one of the tracking parameters for Signal S1 and may be generated and provided by tracker 4220 of first processing module 4200; D represents a code phase offset between Signal S1 and Signal S2, which may be a predetermined value based on nominal characteristics of Signal S1 and Signal S2; GDD represents a group delay difference between Signal S1 and Signal S2, which is calculated by GDD compensator 4320; $T'_2(k)$ represents the $k_{th}$ updated code phase hypothesis for Signal S2; $\Delta T$ represents a code phase increment between two neighboring code phase hypotheses for Signal S2, which may be a predetermined value (for example, a predetermined number of code chips) in accordance with the CSK modulation; and P represents a total number of possible code phases used in the CSK modulation for Signal S2. P would be 256 in the example CSK modulation as shown in FIG. 3.

In an embodiment, converter 4311-2 may be configured to provide the updated one or more code phase hypotheses for Signal S2 to local signal generators 4312. Local signal generators 4312 may be configured to generate updated one or more local replicas of Signal S2 based on the updated one or more code phase hypotheses for Signal S2. The updated one or more local replicas of Signal S2 may be further used by correlators 4313. By using the updated one or more code phase hypotheses for which the GDD has been compensated, a better alignment between the updated one or more local replicas of Signal S2 and received Signal S2 may be achieved, thereby achieving better decoding performance (for example, better accuracy). In other words, the GDD compensation optimizes the decoding conditions for a lowest bit-error rate.

In an embodiment, converter 4311-2 may be configured to provide the updated one or more code phase hypotheses for Signal S2 to the early-late gates 4322, such that the local replicas of Signal S2 used by the early-late gates 4322 may also be updated. For example, the updated code phase hypotheses may be provided to the triggered pair of early-late gates in the early-late gates 4322. The early local replica and the late local replica used by the triggered pair of early-late gates may be adjusted based on an updated code phase hypothesis that corresponds to the triggered pair of early-late gates.

In one embodiment, the pre-defined group of code phase hypotheses used to determine a trigger condition may correspond to all P possible shifted code phases in the CSK modulation for Signal S2. In other words, the pre-defined group of code phase hypotheses may include P code phases. In this case, the trigger module 4321 will always trigger a corresponding pair of early-late gates no matter which CSK symbol has been detected. This requires the early-late gates 4322 to include at least P pairs of early-late gates, which may not be necessary and economic.

In a preferred embodiment, the pre-defined group of code phase hypotheses may correspond to only a subset of the P possible shifted code phases in the CSK modulation for Signal S2. For example, the pre-defined group of code phase hypotheses may include only M selected code phase hypotheses of Signal S2, M being a positive integer that is no greater than P. As such, the number of pairs of early-late gates to be implemented may be reduced to M. The M selected code phase hypotheses may represent M opportunistic code phase hypotheses. For Example, the M selected code phase hypotheses may correspond to M shifted code phases that have M highest a priori occurrence probabilities from a total of P shifted code phases used in the CSK modulation scheme of Signal S2. Note that the M opportunistic code phase hypotheses may be selected from the set of $T_2(k)$ (or $T'_2(k)$), k=0, . . . , N−1 as calculated above. Also, the M opportunistic code phase hypotheses may not necessarily continuously and uniformly space in the set of $T_2(k)$ (or $T'_2(k)$), k=0, . . . , N−1.

Note that, since the M selected code phase hypotheses represent shifted code phases that have highest priori occurrence probabilities, there is still a relatively high possibility that the pre-defined group of code phase hypotheses will include the code phase corresponding to the detected CSK symbol. As a result, in most of the cases, the early-late gates 4322 will still be triggered to provide a code phase delay correction (or, more specifically, a calculated GDD). This provides an acceptable performance with reduced number of early-late gates.

The M code phases that have M highest priori occurrence probabilities may be determined in many ways. In a well-designed system, all CSK payload symbols should have even distribution. However, there're always preambles that show up periodically. In an embodiment, a static approach may be used by studying the frame structure in the standard of the CSK modulation. For example, it is possible to determine an approximate occurrence probability for each CSK symbol by analyzing the specific coding and modulation scheme used in the R-S encoder and/or the CSK modulator of the satellite. In another embodiment, a dynamic approach on the fly or offline can work, where occurrence statistics of the detected CSK symbols are collected, and those M code phases having the highest occurrence probability can be figured out based on the collected CSK symbols. For example, it is possible to determine an approximate occurrence probability for each CSK symbol by analyzing statistics of CSK symbols that have been detected by the receiver over a period of time (for example, by calculating the number of occurrences in the received Signal S2). The M code phases can be selected based on the determined approximate occurrence probabilities for CSK symbols. Once the M code phases have been selected, the early-late gates 4322 may be configured to include a corresponding pair of early-late gates for each of the M code phases.

Additionally, the M code phases (and corresponding pairs of early-late gates) may be determined in a static manner or in a dynamic manner during runtime. In one embodiment, the M code phases may be predetermined before running the device 4000. In another embodiment, the M code phases may be determined and configured dynamically in real time. For example, during running of device 4000, trigger module 4321 may periodically determine the M code phases with highest priori occurrence probabilities based on the statistics of CSK symbols that have been detected by the receiver over a period of time.

Note that M may be any desired number. M may be determined based on the capability of device 4000, for example, hardware/software resource available for device 4000. A greater M may use more resources and provide a higher hitting rate. A higher hitting rate means that a higher percentage of the CSK symbols detected by symbol detector 4314 correspond to code phases that are included in the pre-defined group of code phase hypotheses for the Signal S2. In an embodiment, note that $T_2(0)$ has the highest probability because there are many frames with running zeros. In view of this, the M code phases may be selected as $T_2(0)$, $T_2(1)$, $T_2(2)$, $T_2(3)$, and $T_2(4)$ as calculated by Equation 2 and Equation 3, where M=5. In this case, if the detected CSK symbol corresponds to any of the first five code phase hypotheses, the calculation of GDD would be triggered. In an alternative embodiment, other code phases may be specified, such as $T_2(0)$, $T_2(3)$, $T_2(7)$, $T_2(8)$ and $T_2(12)$.

Note that device 4000 provides a group delay compensation loop filter which is a simple 1st order filter, the only state variable being the current estimated group delay difference, "GDD". The loop's noise bandwidth is not precisely defined because the loop updates irregularly, but the loop gain is set to be very low, since it only tracks very slowly varying components. The time constant of the loop may be in the order of tens of seconds rather than seconds. Note that the receiver and clock dynamics are accounted for by tracking for Signal S1, and the loop for Signal S2 will only see a very small residual of it.

It will be appreciated that the implementation of device 4000 as shown in FIG. 5 is illustrative and is not intended to be limiting. Many modifications may be applied within the scope of the spirit of the present disclosure.

In one aspect, the boundaries between the boxes are merely illustrative. One element may be divided into multiple sub-elements. Multiple element may be incorporated into a single element. For example, converters 4311-1 and 4311-2 may be incorporated as a single converter 4311. In addition, early-late gates 4322, early-late gate comparator 4323 and/or gain component 4324 may be incorporated as a single element. Other elements may be divided or incorporated.

In another aspect, multiple elements may be implemented in separate hardware devices or in a single hardware device. Note that tracker 4220, correlators 4313 and the early-late gates 4322 each involve a plurality of correlation operations. In one example, these elements may be separately implemented in different devices. In another example, these elements may share a single hardware device that includes a large number of correlating channels.

In another aspect, operations performed by one element may be performed by another element. For example, the updating of the one or more code phase hypotheses may not be performed at the converter 4311-1. Instead, GDD compensator 4320 may provide the updated one or more code phase hypotheses directly to local signal generators 4312 and/or the early-late gates 4322. Alternatively, GDD compensator 4320 may provide the calculated GDD to local signal generators 4312 and/or the early-late gates 4322 such that local signal generators 4312 and/or the early-late gates 4322 may update the code phase hypotheses being used.

Figure 6:
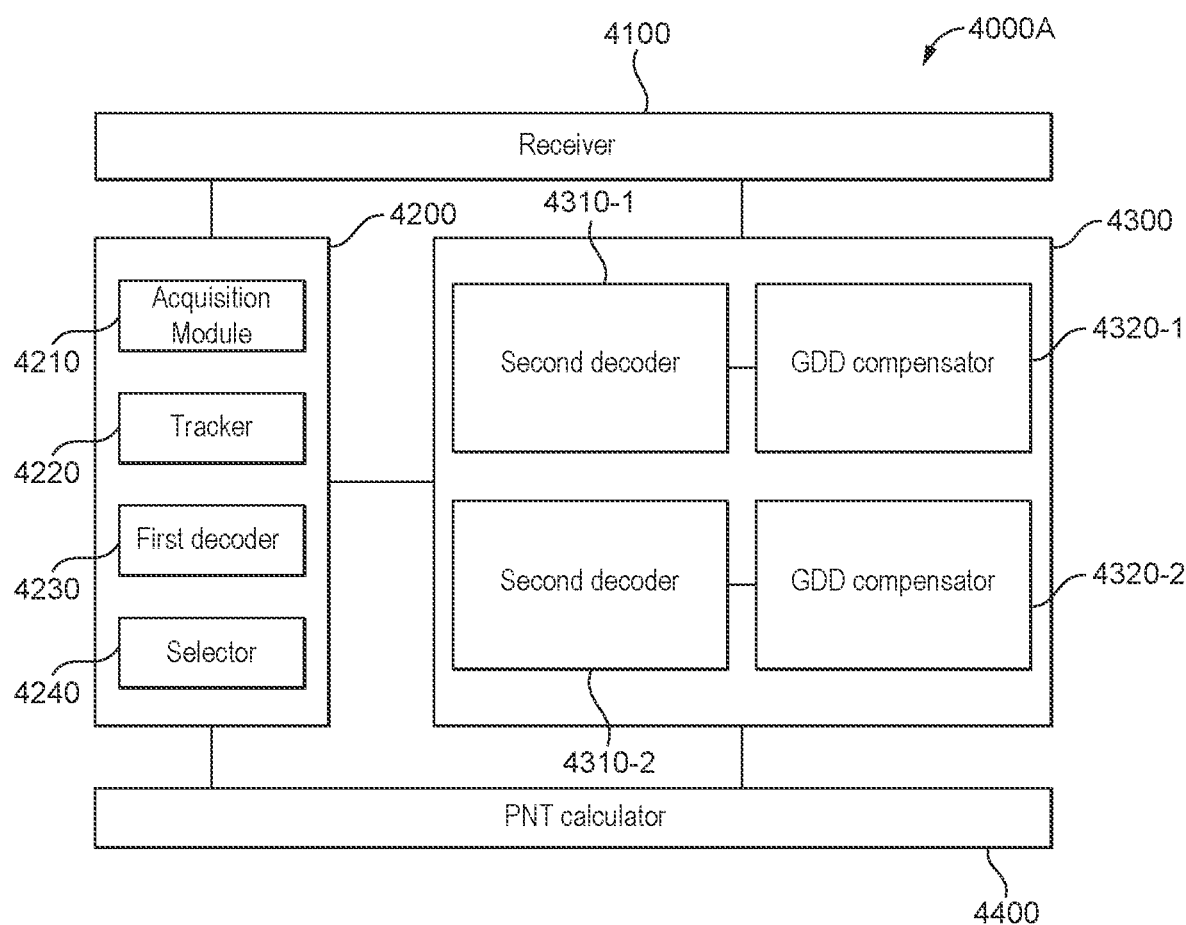
FIG. 6 is a block diagram illustrating another example device for concurrently decoding multiple data streams in accordance with embodiments herein.

FIG. 6 is a block diagram illustrating another example device 4000A for concurrently decoding multiple data streams in accordance with embodiments herein. As compared to the example device 4000 of FIG. 4, device 4000A may include two sets of second decoders 4310 and GDD compensators 4320. The first set of second decoder 4310-1 and GDD compensator 4320-1, may be configured to process a first data stream, while the second set of second decoder 4310-2 and GDD compensator 4320-2, may be configured to process a second data stream. Second decoders 4310-1 and 4310-2 may have the same function as second decoder 4310 of device 4000, and GDD compensators 4320-1 and 4320-2 may have the same function as GDD compensator 4320 of device 4000.

In an embodiment, the first data stream and the second data stream may be decoded independently. That is, the decoding and GDD compensating performed for the first stream may be independent of the decoding and GDD compensating performed for the second stream, and vice versa.

In an embodiment, the first data stream and the second data stream may be decoded concurrently. That is, the decoding and GDD compensating performed for the first stream may be performed simultaneously to the decoding and GDD compensating performed for the second stream.

In one embodiment, the first data stream and the second data stream may correspond to two Signals S2 that are transmitted by two satellites. For example, receiver 4100 may receive two satellite signals transmitted from satellite 1200-1 and satellite 1200-2. Each satellite signal may include a respective Signal S1 and a respective Signal S2. First processing module 4200 may track Signal S1 in each of the two satellite signals and generate corresponding tracking parameters for said Signal S1. The generated tracking parameters for Signal S1 may be provided to a respective set of second decoder 4310 and GDD compensator 4320 for the decoding of a respective Signal S2. Specifically, tracking parameters for Signal S1 of satellite 1200-1 may be provided to the first set of second decoder 4310-1 and GDD compensator 4320-1 so as to decode a first data stream of Signal S2 of the satellite 1200-1. Tracking parameters for Signal S1 of satellite 1200-2 may be provided to the second set of second decoder 4310-2 and GDD compensator 4320-2 so as to decode a second data stream of Signal S2 of the satellite 1200-2. Note that the first set of second decoder 4310-1 and GDD compensator 4320-1 or the second set of second decoder 4310-2 and GDD compensator 4320-2 may each operate as described for second decoder 4310 and GDD compensator 4320.

In a further embodiment, the first data stream and the second data stream may correspond to two data streams of the same type in two Signals S2 that are transmitted by two satellites. L62 signal is an example of Signal S2, which is transmitted by a QZSS satellite. L62 signal includes a L6D data stream and a L6E data stream. In one example, the first data stream may correspond to L6D data stream in Signal S2 of a first satellite while the second data stream may correspond to L6D data stream in Signal S2 of a second satellite. In another example, the first data stream may correspond to L6E data stream in Signal S2 of a first satellite while the second data stream may correspond to L6E data stream in Signal S2 of a second satellite.

It will be also appreciated that device 4000A may include more than two sets of second decoders 4310 and GDD compensators 4320 such that more than two satellite signals may be processed. In an embodiment, first processing module 4200 may further include a selector 4240. Selector 4240 may be configured to select desired signals to be processed by second processing module 4300. For example, the receiver 4100 may receive multiple satellite signals transmitted from multiple satellites. Each satellite signal includes a respective Signal S1 and a respective Signal S2. Selector 4240 may be configured to select only a subset of the multiple satellite signals. The selection may be based on characteristics of the received satellite signals. For example, selector 4240 may select satellite signals based on signal-to-noise ratio (SNR) of the multiple satellite signals. The SNR may be a SNR for Signal S1, which may be determined during the tracking of Signal S1. Satellite signals (for example, two satellite signals) with the highest SNR will be determined to be processed by second processing module 4300, i.e., the first set of second decoder 4310-1 and GDD compensator 4320-1 and/or the second set of second decoder 4310-2 and GDD compensator 4320-2.

In an embodiment, the first data stream and the second data stream may correspond to two data streams that are transmitted in the same Signal S2 by a single satellite. As an example of Signal S2, L62 signal includes a L6D data stream and a L6E data stream. The first data stream may correspond to L6D data stream of a L62 signal, and the second data stream may correspond to L6E data stream of the same L62 signal. The tracking parameters for Signal S1 may be provided to respectively decode L6D data stream and L6E data stream of L62 signal. Decoding of L6D and L6E data streams may be performed independently and concurrently.

It will be also appreciated that the elements of device 4000 or 4000A may be implemented as any of hardware, software, firmware, or any combination thereof. In an embodiment, all element may be implemented as software modules running on a generic processor. In another embodiment, the elements may be loaded on a hardware such that the hardware may be used as a standalone GNSS chip/processor. In further embodiment, device 4000 or 4000A may be implemented as a combination of software and hardware.

It will be also appreciated that conventional hardware modules may be reused in device 4000 or 4000A. For example, any conventional single satellite tracking channel may be used as a correlator of device 4000 or 4000A. The single satellite tracking channel may include one or more taps (for example, X taps), each tap corresponding to a respective code phase and thus providing a respective correlating output. For correlators 4313 that requires P (for example, 256) correlation results, the number of required single satellite tracking channels may be calculated as ceil (P/X), where ceil ( ) is a function that rounds up to an integer. For the early-late gates 4322 that will be triggered under M selected code phase hypotheses of Signal S2, the number of required single satellite tracking channels may be calculated as ceil (M/X/2). Tracker 4220 may also require at least one single satellite tracking channel. Hence, a number of single satellite tracking channels contained in one device may be divided into several sets, each set used for tracker 4220, converter 4313 or E-L gates 4322. In other embodiment, other types of correlators may be used.

Figure 7:
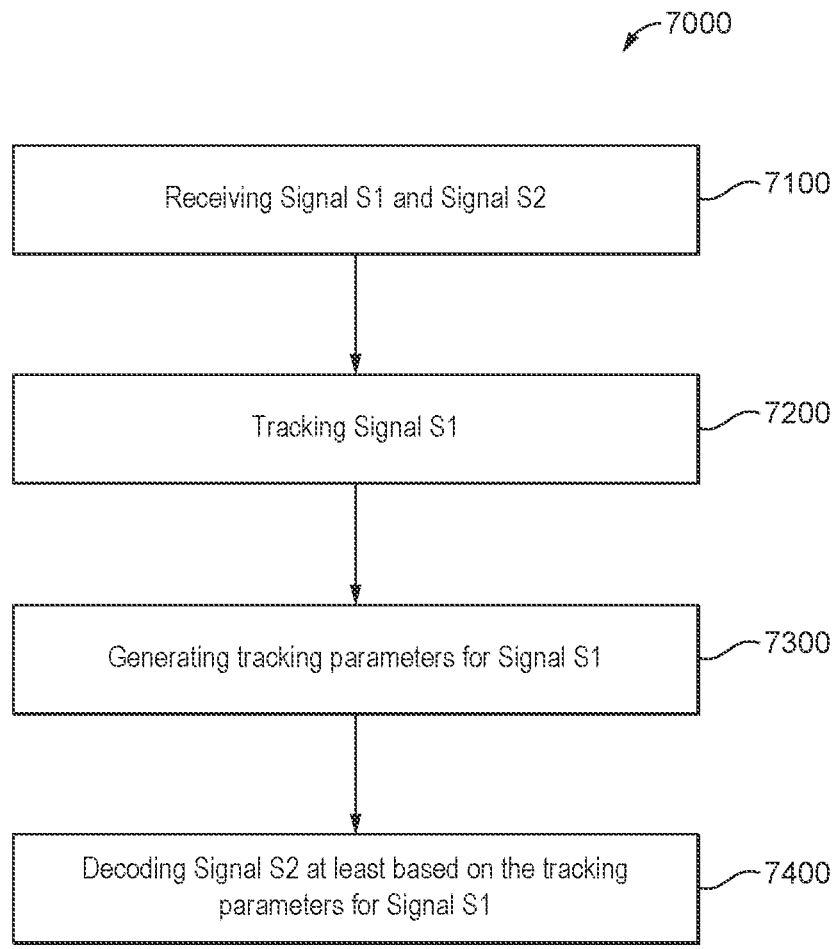
FIG. 7 is a flow diagram illustrating an example method for processing two different types of GNSS signals in accordance with embodiments herein.

FIG. 7 is a flow diagram illustrating an example method 7000 for processing two different types of GNSS signals in accordance with embodiments herein. Method 7000 may be performed by device 4000 (or device 4000A). The two different types of GNSS signals may include Signal S1 and Signal S2.

Method 7000 may begin with step 7100, in which Signal S1 transmitted in a first GNSS operational band by a satellite of the GNSS and Signal S2 transmitted in a second GNSS operational band by the same satellite may be received. Step 7100 may be performed by receiver 4100 of device 4000. In an embodiment, the first GNSS operational band may be one of L1 band, L2 band or L5 band, and the second GNSS operational band may be L6 band.

In an embodiment, method 7000 may further include step 7200 and step 7300. In step 7200, Signal S1 may be tracked. In step 7300, tracking parameters for Signal S1 may be generated from the tracking of Signal S1. Step 7200 and 7300 may be performed by tracker 4220 of device 4000.

In an embodiment, method 7000 may further include step 7400, in which Signal S2 is decoded at least based on the tracking parameters for Signal S1. Step 7400 may be performed by decoder 4310 of device 4000.

In an embodiment, Signal S2 may be a Code Shift Keying (CSK) signal. For example, Signal S2 may be one of L61 signal or L62 signal as described in FIGS. 2A-2B, which is subject to a CSK modulation as described in FIG. 3. It will be appreciated that Signal S2 may have another CSK modulation that is different from the specific CSK modulation of FIG. 3. For example, different PRN codes may be used. Also, a different length (other than 8 bits) of encoded navigation message may be used.

In an embodiment, the tracking parameters for Signal S1, which are generated in step 7300, may comprise at least one of a Doppler frequency for Signal S1 and a code phase for Signal S1.

In an embodiment, the decoding of Signal S2 may comprise deriving, from the tracking parameters for Signal S1, parameters for decoding Signal S2. The derived parameters may comprise a Doppler frequency for Signal S2 and one or more code phase hypotheses for Signal S2. Said operations may be performed by converter 4311 of device 4000.

In an embodiment, deriving the parameters for decoding Signal S2 may comprise calculating the Doppler frequency for Signal S2 in accordance with Equation 1:

$$f_2 = f_1 * (F_2/F_1),$$

where $F_1$ is a nominal carrier frequency of Signal S1, $f_1$ represents the Doppler frequency for Signal S1, and $F_2$ represents a nominal carrier frequency of Signal S2, and $f_2$ represents the Doppler frequency for Signal S2.

In an embodiment, deriving the parameters for decoding Signal S2 may comprise generating the code phase hypotheses for Signal S2 by Equations 2 and 3:

$$T_2(0) = T_1 + D,$$

$$T_2(k) = T_2(0) + k * \Delta T, k=0, \ldots, P-1$$

where $T_1$ represents the code phase for Signal S1, D represents a code phase offset between Signal S1 and Signal S2, $T_2(k)$ represents the $k_{th}$ code phase hypothesis for Signal S2, $\Delta T$ represents a code phase increment between two neighboring code phase hypotheses for Signal S2, and P represents a total number of code phases used in the CSK modulation scheme for Signal S2.

In an embodiment, the decoding of Signal S2 may further comprise: generating one or more local replicas of Signal S2 based on the Doppler frequency for Signal S2 and the one or more code phase hypotheses for Signal S2, which may be performed by local signal generators 4312 of device 4000; correlating Signal S2 with the one or more local replicas, which may be performed by correlators 4313 of device 4000; detecting one or more CSK symbols based on the correlating, which may be performed by the symbol detector 4314 of device 4000; and detecting and/or correcting bit errors in the one or more CSK symbols, which may be performed by the R-S decoder 4315 of device 4000.

In an embodiment, method 7000 may further comprise: calculating a GDD between Signal S1 and Signal S2 based on the decoding of Signal S2; and feedbacking the calculated GDD for decoding of Signal S2. These operations may be performed by GDD compensator 4320 of device 4000.

In an embodiment, calculating the GDD comprises: detecting at least one CSK symbol of Signal S2; determining whether the at least one detected CSK symbol corresponds to a particular code phase included in a pre-defined group of code phase hypotheses for Signal S2; in response to a determination that the at least one detected CSK symbol corresponds to the particular code phase included in the pre-defined group of code phase hypotheses, triggering a corresponding pair of early-late gates to track the particular code phase to generate the GDD.

In an embodiment, the pre-defined group of code phase hypotheses may include M selected code phase hypotheses of Signal S2. The M selected code phase hypotheses may correspond to M code phases that have M highest priori occurrence probabilities from a total of P code phases used in the CSK modulation of Signal S2. M may be a positive integer that is no greater than P.

In an embodiment, calculating the GDD may comprise: applying an early-late gate comparator to an output of the corresponding pair of early-late gates; and applying a gain to an output of the early-late gate comparator.

In an embodiment, feedbacking the calculated GDD for decoding may comprise: updating code phase hypotheses for Signal S2 at least based on the calculated GDD and a code phase for Signal S1; providing the updated code phase hypotheses for detecting CSK symbols of Signal S2; and providing the updated code phase hypotheses to the corresponding pair of early-late gates.

In an embodiment, Signal S2 may be a QZSS CLAS signal comprising a L6D data stream and a L6E data stream, and the decoding comprises decoding at least one of the L6D data stream or the L6E data stream. In a further embodiment, the decoding of Signal S2 may comprise decoding the L6D and L6E data streams concurrently.

In an embodiment, the satellite from which Signal S1 and Signal S2 are received is a first satellite, method 7000 further comprising steps: receiving a third GNSS signal transmitted in the first GNSS operational band by a second satellite and a fourth GNSS signal transmitted in the second GNSS operational band by the second satellite; tracking the third GNSS signal; generating, from the tracking of the third GNSS signal, tracking parameters for the third GNSS signal; and decoding, at least based on the tracking parameters for the third GNSS signal, the fourth GNSS signal.

In an embodiment, the fourth GNSS signal may be of the same signal type as Signal S2. Specifically, each of Signal S2 and the fourth GNSS signal is a QZSS CLAS signal comprising a L6D data stream and a L6E data stream, the method comprising: decoding two L6D data streams of Signal S2 and the fourth GNSS signal concurrently; or decoding two L6E data streams of Signal S2 and the fourth GNSS signal concurrently.

The technique disclosed herein provides an improved method for processing GNSS signals. Some of the embodiments provide a joint processing of new L6 signal with a conventional signal of L1, L2 or L5 signal. By decoding L6 signal based on the tracking parameters for the conventional signal, the processing of L6 signal can be implemented with a simplified process. For example, an acquisition process and a tracking process may be omitted for L6 signal. This is particularly advantageous when L6 signal adopts a CSK modulation that is different and new to the conventional signal.

In addition, in some embodiments, GDD between L6 signal and the conventional signal is adaptively calculated and compensated. This provides a better accuracy as compared to an assumption that the code phase offset between L6 signal and the conventional signal is a constant value. Also, the adaptive calculation and compensation of GDD is triggered under predefined conditions, which allows to implement the adaptive calculation and compensation of GDD with limited cost but obtain sufficiently good performance.

Note that although Signal S1 may be one of L1, L2 or L5 signal, using a different signal as Signal S1 may provide a different performance. As listed in Table 1, the center carrier frequencies of L1, L2, L5, and L6 signals are 1575.42 MHz, 1227.60 MHz, 1176.45 MHz, and 1278.75 MHz, respectively. Hence, L2 signal has the least frequency difference with L6 signal, while L1 signal has the largest frequency difference with L6 signal. Note that a GDD between two signals depends on the frequency difference between the two signals. Hence, with L6 signal being Signal S2, selecting L2 signal among L1, L2 and L5 signals as Signal S1 will provide the least GDD and thus the best performance. Using L1 signal as Signal S1 will provide a larger GDD and thus a less good performance. In an embodiment, Signal S1 may be selected as L1 signal. In a preferred embodiment, Signal S1 may be selected as L5 signal. In an optimal embodiment, Signal S1 may be selected as L2 signal.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
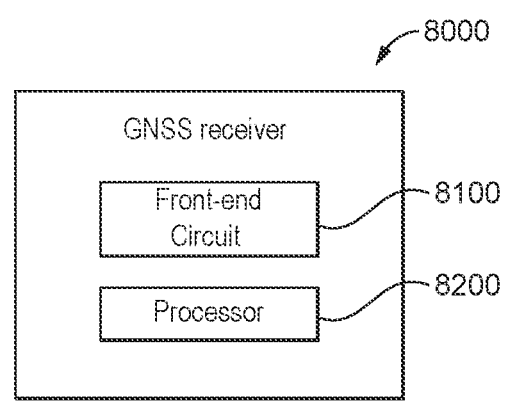
FIG. 8 is a block diagram illustrating a GNSS receiver that implements techniques in accordance with embodiments herein.

FIG. 8 is a block diagram illustrating a GNSS receiver 8000 that implements techniques in accordance with embodiments herein. GNSS receiver 8000 may be an example of receiver 1100 of FIG. 1. GNSS receiver may include a front end circuit 8100 and a processor 8200. In an embodiment, front end circuit 8100 may be configured to receive from free space satellite signals that are transmitted by GNSS satellites. For example, front end circuit 8100 may include an antenna array that is configured to operate in a first GNSS operational band and a second GNSS operational band. The antenna array may receive Signal S1 of the first GNSS operational band and Signal S2 of the second GNSS operational band that are both transmitted by a same satellite. Front end device may be configured to further communicate the received signals to the processor 8200. In an embodiment, processor 8200 may be configured to perform method 7000 of FIG. 7. For example, processor 8200 may be an example implementation of device 4000 (or 4000A) as described above. Processor 8200 may take a form of a GNSS processor/chip/module. In addition, processor 8200 may be configured to provide the PNT information for display or communicate the PNT information to another device or application.

Figure 9:
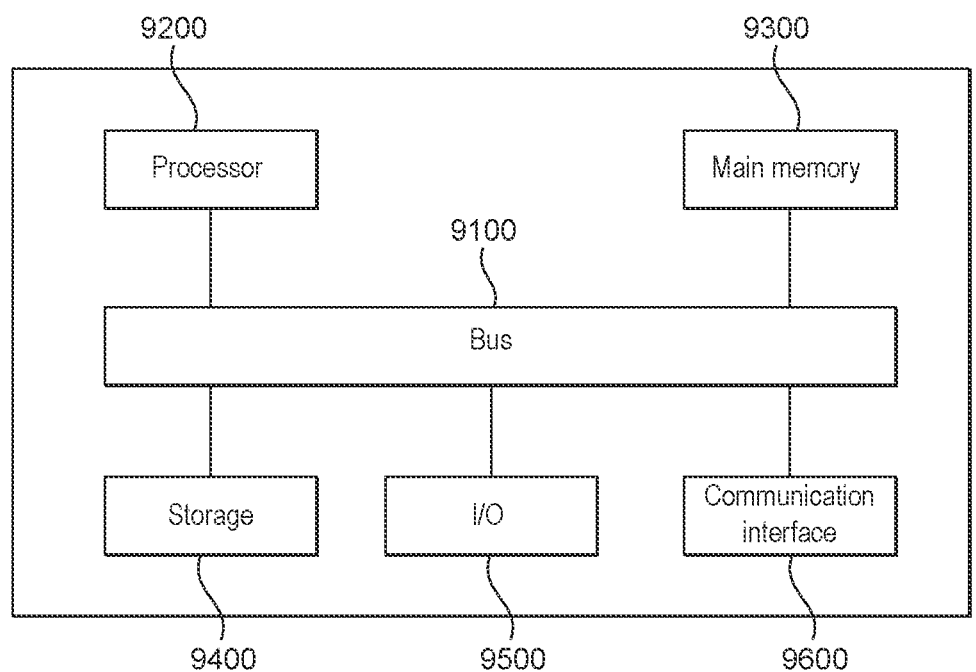
FIG. 9 is a block diagram illustrating a computing device capable of implementing techniques in accordance with embodiments herein.

FIG. 9 is a block diagram illustrating a computing device capable of implementing techniques in accordance with embodiments herein.

Computing system 9000 includes a bus 9100 for communicating information, and a hardware processor 9200 coupled with bus 9100 for processing information. Computing system 9000 also includes a main memory 9300, such as a random-access memory (RAM) or other dynamic storage device, coupled to bus 9100 for storing information and instructions to be executed by processor 9200. Main memory 9300 also may be used for storing temporary variables or other intermediate information during execution of instructions to be executed by processor 9200. Such instructions, when stored in non-transitory storage media accessible to processor 9200, render computing system 9000 into a special-purpose machine that is customized to perform the operations specified in the instructions.

Computing system 9000 further includes a storage device 9400 coupled to bus 9100 for storing static information and instructions for processor 9200. A storage device 9400, such as a magnetic disk or optical disk, is provided and coupled to bus 9100 for storing information and instructions.

Computing system 9000 may include I/O interface 9500. For example, computing system may be coupled via bus 9100 to a display, such as a cathode ray tube (CRT), for displaying information to a computer user. An input device, including alphanumeric and other keys, is coupled to bus 9100 for communicating information and command selections to processor 9200. Another type of user input device is cursor control, such as a mouse, a trackball, or cursor direction keys for communicating direction information and command selections to processor 9200 and for controlling cursor movement on display.

Computing system 9000 may implement the techniques described herein using customized hard-wired logic, one or more ASICs or FPGAs, firmware and/or program logic which in combination with the computer system causes or programs Computing system 9000 to be a special-purpose machine. According to one embodiment, the techniques herein are performed by computing system 9000 in response to processor 9200 executing one or more sequences of one or more instructions contained in main memory 9300. Such instructions may be read into main memory 9300 from another storage medium, such as storage device 9400. Execution of the sequences of instructions contained in main memory 9300 causes processor 9200 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 9300. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Computing system 9000 may also include a communication interface 9600 coupled to bus 9100. Communication interface 9600 provides a two-way data communication coupling to an external device. For example, communication interface 9600 may be an integrated-services digital network (ISDN) card, cable modem, satellite modem, or a modem to provide a data communication connection to a corresponding type of telephone line. As another example, communication interface 9600 may be a local area network (LAN) card to provide a data communication connection to a compatible LAN. Wireless links may also be implemented. In any such implementation, communication interface 9600 sends and receives electrical, electromagnetic or optical signals that carry digital data streams representing various types of information.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for processing satellite signals of a Global Navigation Satellite System (GNSS), the method comprising:
receiving a first GNSS signal transmitted in a first GNSS operational band by a satellite of the GNSS and a second GNSS signal transmitted in a second GNSS operational band by the satellite, the first GNSS operational band being one of an L1 band, an L2 band, or an L5 band, and the second GNSS operational band being an L6 band;
tracking the first GNSS signal;
generating tracking parameters for the first GNSS signal, the tracking parameters for the first GNSS signal comprising at least one of:
a Doppler frequency for the first GNSS signal, or
a code phase for the first GNSS signal; and
decoding, at least based on the tracking parameters for the first GNSS signal, the second GNSS signal, wherein decoding the second GNSS signal comprises:
deriving, from the tracking parameters for the first GNSS signal, parameters for decoding the second GNSS signal, wherein deriving the parameters for decoding the second GNSS signal comprises:
calculating a Doppler frequency for the second GNSS signal by:

$$f_2 = f_1 * (F_2/F_1),$$

where $F_1$ is a nominal carrier frequency of the first GNSS signal,
$f_1$ represents the Doppler frequency for the first GNSS signal,
$F_2$ represents a nominal carrier frequency of the second GNSS signal, and
$f_2$ represents the Doppler frequency for the second GNSS signal; and
generating one or more code phase hypotheses for the second GNSS signal by:

$$T_2(0) = T_1 + D,$$

$$T_2(k) = T_2(0) + k*\Delta T, k=0, \ldots, P-1,$$

where $T_1$ represents the code phase for the first GNSS signal,
D represents a code phase offset between the first GNSS signal and the second GNSS signal,
$T_2(k)$ represents the $k^{th}$ code phase hypothesis for the second GNSS signal,
$\Delta T$ represents a code phase increment between two neighboring code phase hypotheses for the second GNSS signal, and
P represents a total number of code phases used in a Code Shift Keying (CSK) scheme for the second GNSS signal.

2. The method of claim 1, wherein the second GNSS signal is a Code Shift Keying (CSK) signal.

3. The method of claim 1, further comprising:
calculating, based on a result of the decoding, a group delay difference (GDD) between the first GNSS signal and the second GNSS signal; and
feedbacking the calculated GDD for decoding of the second GNSS signal.

4. The method of claim 1, wherein the GNSS is Quasi-Zenith Satellite System (QZSS), the second GNSS signal is a QZSS Centimeter Level Augmentation Service (CLAS) signal comprising an L6D data stream and an L6E data stream, and decoding the second GNSS signal comprises:
decoding at least one of the L6D data stream or the L6E data stream; or
decoding the L6D and L6E data streams concurrently.

5. The method of claim 1, wherein the satellite of the GNSS is a first satellite, the method further comprising:
receiving a third GNSS signal transmitted in the first GNSS operational band by a second satellite of the GNSS and a fourth GNSS signal transmitted in the second GNSS operational band by the second satellite;
tracking the third GNSS signal;
generating, from the tracking of the third GNSS signal, tracking parameters for the third GNSS signal; and
decoding, at least based on the tracking parameters for the third GNSS signal, the fourth GNSS signal.

6. The method of claim 5, wherein the GNSS is Quasi-Zenith Satellite System (QZSS), and each of the second GNSS signal and the fourth GNSS signal is a QZSS Centimeter Level Augmentation Service (CLAS) signal comprising an L6D data stream and an L6E data stream, the method comprising:
decoding two L6D data streams of the second GNSS signal and the fourth GNSS signal concurrently; or
decoding two L6E data streams of the second GNSS signal and the fourth GNSS signal concurrently.

7. A device for processing navigation satellite signals of a Global Navigation Satellite System (GNSS), the device comprising:
a receiver configured to:
receive a first GNSS signal transmitted in a first GNSS operational band by a satellite of the GNSS, the first GNSS operational band being one of an L1 band, an L2 band, or an L5 band; and
receive a second GNSS signal transmitted in a second GNSS operational band by the satellite, the second GNSS operational band being an L6 band;
a tracker configured to:
track the first GNSS signal; and
generate, from the tracking of the first GNSS signal, tracking parameters for the first GNSS signal, the tracking parameters for the first GNSS signal comprising at least one of:
a Doppler frequency for the first GNSS signal, or
a code phase for the first GNSS signal; and
a decoder configured to:
decode, at least based on the tracking parameters for the first GNSS signal, the second GNSS signal, wherein the decoder is configured to decode the second GNSS signal by:
deriving, from the tracking parameters for the first GNSS signal, parameters for decoding the second GNSS signal, wherein the decoder is configured to derive the parameters for decoding the second GNSS signal by:
calculating a Doppler frequency for the second GNSS signal by:

$$f_2 = f_1 * (F_2/F_1),$$

where $F_1$ is a nominal carrier frequency of the first GNSS signal, $f_1$ represents the Doppler frequency for the first GNSS signal, $F_2$ represents a nominal carrier frequency of the second GNSS signal, and $f_2$ represents the Doppler frequency for the second GNSS signal; and generating one or more code phase hypotheses for the second GNSS signal by:

$$T_2(0)=T_1+D,$$

$$T_2(k)=T_2(0)+k*\Delta T, k=0,\ldots,P-1,$$

where $T_1$ represents the code phase for the first GNSS signal,

D represents a code phase offset between the first GNSS signal and the second GNSS signal, $T_2(k)$ represents the $k^{th}$ code phase hypothesis for the second GNSS signal, $\Delta T$ represents a code phase increment between two neighboring code phase hypotheses for the second GNSS signal, and P represents a total number of code phases used in a Code Shift Keying (CSK) scheme for the second GNSS signal.

8. The device of claim 7, wherein the second GNSS signal is a Code Shift Keying (CSK) signal.

9. The device of claim 7, further comprising a group delay difference (GDD) compensator configured to:

based on the decoding of the second GNSS signal, calculate a group delay difference (GDD) between the first GNSS signal and the second GNSS signal; and feedback the calculated GDD to the decoder.

10. The device of claim 7, wherein the GNSS is Quasi-Zenith Satellite System (QZSS), the second GNSS signal is a QZSS Centimeter Level Augmentation Service (CLAS) signal comprising an L6D data stream and an L6E data stream, and the decoder is configured to:

decode at least one of the L6D data stream or the L6E data stream; or decode the L6D and L6E data streams concurrently.

11. The device of claim 7, wherein:

the satellite of the GNSS is a first satellite;

the receiver is further configured to receive a third GNSS signal transmitted in the first GNSS operational band by a second satellite of the GNSS and a fourth GNSS signal transmitted in the second GNSS operational band by the second satellite;

the tracker is further configured to track the third GNSS signal and generate, from the tracking of the third GNSS signal, tracking parameters for the third GNSS signal; and the decoder is further configured to decode, at least based on the tracking parameters for the third GNSS signal, the fourth GNSS signal.

12. The device of claim 11, wherein the GNSS is Quasi-Zenith Satellite System (QZSS), and each of the second GNSS signal and the fourth GNSS signal is a QZSS Centimeter Level Augmentation Service (CLAS) signal comprising an L6D data stream and an L6E data stream, the decoder being configured to:

decode two L6D data streams of the second GNSS signal and the fourth GNSS signal concurrently; or decode two L6E data streams of the second GNSS signal and the fourth GNSS signal concurrently.

13. A device for processing satellite signals of a Global Navigation Satellite System (GNSS), the device comprising:

one or more processors; and at least one machine-readable medium comprising executable instructions that, when executed by the one or more processors, cause the device to:

receive a first GNSS signal transmitted in a first GNSS operational band by a satellite of the GNSS and a second GNSS signal transmitted in a second GNSS operational band by the satellite, the first GNSS operational band being one of an L1 band, an L2 band, or an L5 band, and the second GNSS operational band being an L6 band;

track the first GNSS signal;

generate tracking parameters for the first GNSS signal, the tracking parameters for the first GNSS signal comprising at least one of:

a Doppler frequency for the first GNSS signal, or a code phase for the first GNSS signal; and decode, at least based on the tracking parameters for the first GNSS signal, the second GNSS signal, wherein the one or more processors are configured to execute the instructions to cause the device to decode the second GNSS signal by:

deriving, from the tracking parameters for the first GNSS signal, parameters for decoding the second GNSS signal, wherein the one or more processors are configured to execute the instructions to cause the device to derive the parameters for decoding the second GNSS signal by:

calculating a Doppler frequency for the second GNSS signal by:

$$f_2=f_1*(F_2/F_1),$$

where $F_1$ is a nominal carrier frequency of the first GNSS signal, $f_1$ represents the Doppler frequency for the first GNSS signal, $F_2$ represents a nominal carrier frequency of the second GNSS signal, and $f_2$ represents the Doppler frequency for the second GNSS signal; and generating one or more code phase hypotheses for the second GNSS signal by:

$$T_2(0)=T_1+D,$$

$$T_2(k)=T_2(0)+k*\Delta T, k=0,\ldots,P-1,$$

where $T_1$ represents the code phase for the first GNSS signal,

D represents a code phase offset between the first GNSS signal and the second GNSS signal, $T_2(k)$ represents the $k^{th}$ code phase hypothesis for the second GNSS signal, $\Delta T$ represents a code phase increment between two neighboring code phase hypotheses for the second GNSS signal, and P represents a total number of code phases used in a Code Shift Keying (CSK) scheme for the second GNSS signal.

14. The device of claim 13, wherein the second GNSS signal is a Code Shift Keying (CSK) signal.

* * * * *